US009545995B1

(12) United States Patent
Chau et al.

(10) Patent No.: US 9,545,995 B1
(45) Date of Patent: Jan. 17, 2017

(54) CONTROL NORMALIZATION FOR UNMANNED AUTONOMOUS SYSTEMS

(71) Applicant: QUALCOMM Incorporated, San Diego, CA (US)

(72) Inventors: Kiet Tuan Chau, San Diego, CA (US); Michael-David Nakayoshi Canoy, San Diego, CA (US); Michael Orlando DeVico, San Diego, CA (US); Stephen Alton Sprigg, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 241 days.

(21) Appl. No.: 14/798,715

(22) Filed: Jul. 14, 2015

(51) Int. Cl.
| | | |
|---|---|---|
| *B64C 13/06* | (2006.01) | |
| *B64C 39/02* | (2006.01) | |
| *G05D 1/00* | (2006.01) | |
| *G05D 1/10* | (2006.01) | |
| *G05B 13/04* | (2006.01) | |

(52) U.S. Cl.
CPC ............ *B64C 13/06* (2013.01); *B64C 39/024* (2013.01); *G05B 13/04* (2013.01); *G05D 1/0011* (2013.01); *G05D 1/101* (2013.01); *B64C 2201/141* (2013.01); *B64C 2201/146* (2013.01)

(58) Field of Classification Search
CPC .. B64C 13/06; B64C 39/024; B64C 2201/141; B64C 2201/146; G05D 1/0011; G05D 1/101; G05B 13/04
See application file for complete search history.

(56) References Cited

U.S. PATENT DOCUMENTS

| 7,219,861 | B1 | 5/2007 | Barr |
|---|---|---|---|
| 7,343,232 | B2 * | 3/2008 | Duggan ............... G05D 1/0061 244/75.1 |
| 7,831,351 | B1 | 11/2010 | Hofer et al. |
| 8,897,931 | B2 | 11/2014 | Spinelli |

(Continued)

FOREIGN PATENT DOCUMENTS

| DE | 19811435 A1 | 9/1999 |
|---|---|---|
| WO | 9412372 A1 | 6/1994 |

OTHER PUBLICATIONS

International Search Report and Written Opinion—PCT/US2016/033764—ISA/EPO—Aug. 4, 2016.

*Primary Examiner* — Michael J Zanelli
(74) *Attorney, Agent, or Firm* — The Marbury Law Group, PLLC

(57) ABSTRACT

Methods, systems, and process-readable media include an autonomous vehicle override control system that receives override commands from a pilot qualified on a first type of unmanned autonomous vehicle (UAV) and translates the inputs into suitable commands transmitted to a target UAV of a second UAV type. A pilot's certification for a first UAV type may be determined from the pilot's login credentials. The system may obtain a first control model for the first UAV type and a second control model for the target UAV. Pilot input commands processed through the first control model may be used to calculate movements of a virtual UAV of the type. The system may estimate physical movement of the target UAV similar to the first physical movement, and generate an override command for the target UAV using the second control model and the second physical movement. Control models may accommodate current conditions and pilot experience.

30 Claims, 7 Drawing Sheets

(56) References Cited

U.S. PATENT DOCUMENTS

| | | | |
|---|---|---|---|
| 9,256,225 B2* | 2/2016 | Downey | G08G 5/006 |
| 2003/0095046 A1 | 5/2003 | Borugian | |
| 2007/0235584 A1* | 10/2007 | Corman | H04L 67/125 |
| | | | 244/75.1 |
| 2009/0222148 A1 | 9/2009 | Knotts et al. | |
| 2011/0221692 A1 | 9/2011 | Seydoux et al. | |
| 2011/0301925 A1* | 12/2011 | McWilliams, III | G09B 9/48 |
| | | | 703/6 |
| 2013/0040620 A1 | 2/2013 | Van Wiemeersch et al. | |
| 2016/0274578 A1* | 9/2016 | Arwine | H04L 63/0823 |

* cited by examiner

CONTROL NORMALIZATION FOR UNMANNED AUTONOMOUS SYSTEMS

BACKGROUND

Different types of vehicles may control and operate in very different manners. For example, an F-16 fighter jet has different controls and operating characteristics than a 747 passenger jet or a helicopter. Due to such differences, robust training and certification are typically required for pilots to operate specific vehicles, especially for different types or categories of aircraft. For example, aircraft pilots may have different certifications, ratings, privileges, and limitations regarding the specific make and model of aircraft they are able and allowed to control due to training and/or rated skill sets. Similar certifications may one day be needed for piloting unmanned vehicles, such as commercial and/or hobby drone piloting.

Before operating a different aircraft type or category, pilots typically need to first become certified for or "checked out" in the new aircraft type. For example, before a fixed-wing pilot can fly a helicopter the pilot must obtain numerous hours of aeronautical experience in the specific type of helicopter before being allowed to obtain a license to operate such an aircraft, regardless of previous experience with fixed-wing aircraft.

Nevertheless, piloting experience and knowledge regarding one vehicle type may be relevant to another vehicle type or otherwise translate for some phases of operations of the other vehicle type. For example, a fixed-wing aircraft pilot's experience may be at least partially relevant to controlling some aspects of a helicopter. Such overlapping pilot experience may similarly apply to unmanned autonomous vehicles (UAVs), including air vehicle UAVs that are fixed-wing-type and rotorcraft-type (e.g., quadcopters, multicopters, etc.). For example, as each air vehicle UAV type may share some similar characteristic where lift and power are involved in order to maintain controlled flight, a pilot licensed or otherwise certified to control one air vehicle UAV type may have some ability to fly another air vehicle UAV type. Regardless of any similarities, fixed-wing-type and rotorcraft-type UAVs clearly exhibit very different handling characteristics and control rules in some phases of their operation. Thus pilots' training for one type of aircraft (manned or UAV) may not make them eligible to properly operate other types of aircraft. For example, a fixed-wing aircraft pilot may be able to fly a rotorcraft-type UAV during the cruise phase of flight with some difficulty, but unable to land the rotorcraft-type UAV due to the very different landing methods used by rotorcraft.

SUMMARY

Various embodiments provide methods, devices, systems, and non-transitory process-readable storage media for providing override commands to a target unmanned autonomous vehicle (UAV). Various embodiments include methods performed by a processor of a ground-based autonomous vehicle override control system that may include operations for identifying a certification for a remote pilot for a first UAV type based on login credentials from the remote pilot, obtaining a first control model for the first UAV type based on the certification, obtaining a second control model for the target UAV of a second UAV type, receiving an input command from a control input device corresponding to the first UAV type, calculating a first physical movement of a virtual UAV of the first UAV type using the first control model and the input command, estimating a second physical movement of the target UAV that is similar to the first physical movement, and generating an override command for the target UAV using the second control model and the second physical movement.

In some embodiments, the method may further include transmitting the override command to the target UAV. In some embodiments, the method may further include obtaining connection information for communicating with the target UAV, in which the connection information may be one or more of an access code, a transmission frequency, a transmission medium, an identifier of an intermediary receiver device, and a message format, and in which transmitting the override command to the target UAV may include transmitting the override command to the target UAV using the connection information for the target UAV.

In some embodiments, identifying the certification for the remote pilot for the first UAV type based on the login credentials from the remote pilot may include obtaining a pilot profile for the remote pilot, wherein the pilot profile may be a data record that includes data indicating one or more certifications for piloting different UAV types, and identifying the certification for the first UAV type based on the pilot profile. In some embodiments, the method may further include retrieving an experience profile based on the login credentials from the remote pilot, wherein the experience profile may be stored within the pilot profile and includes data indicating experience with UAVs of the second UAV type, and configuring the first control model and the second control model based at least in part on the experience profile. In some embodiments, the experience with the UAVs of the second UAV type may include a time spent controlling UAVs of the second UAV type, a diversity of maneuvers executed with regard to the UAVs of the second UAV type, or both. In some embodiments, the method may further include updating the experience profile based on the input command.

In some embodiments, obtaining the first control model for the first UAV type based on the certification and obtaining the second control model for the target UAV of the second UAV type may include retrieving the first control model and the second control model from a database of control models. In some embodiments, retrieving the first control model and the second control model from the database of control models may include downloading the database of control models from a remote server.

In some embodiments, calculating the first physical movement of the virtual UAV of the first UAV type using the first control model and the input command may include performing a simulation using the first control model to determine how the virtual UAV of the first UAV type would move in response to receiving the input command. In some embodiments, performing the simulation using the first control model to determine how the virtual UAV of the first UAV type would move in response to receiving the input command may include identifying a setting associated with the virtual UAV for an engine, a flap, an actuator, a rotor, a ballast, or any combination thereof. In some embodiments, performing the simulation using the first control model to determine how the virtual UAV would move in response to receiving the input command may include identifying a change in an altitude of the virtual UAV, a speed of the virtual UAV, a roll state of the virtual UAV, a pitch state of the virtual UAV, a yaw state of the virtual UAV, or any combination thereof.

In some embodiments, estimating the second physical movement that is similar to the first physical movement may include identifying a first component of the target UAV that has a similar function as a second component of the virtual UAV. In some embodiments, generating the override command for the target UAV using the second control model and the second physical movement may include performing a reverse simulation using the second control model to identify the override command that would cause the target UAV to move according to the second physical movement.

In some embodiments, the method may further include obtaining information regarding current conditions at the target UAV, and configuring the first control model and the second control model based at least in part on the information regarding the current conditions at the target UAV. In some embodiments, the information regarding the current conditions at the target UAV may include sensor data from the target UAV, settings of instruments of the target UAV, weather conditions near the target UAV, or any combination thereof. In some embodiments, the method may further include synchronizing a display, the control input device, or both to the information regarding the current conditions at the target UAV.

Further embodiments include a computing device configured with processor-executable instructions for performing operations of the methods described above. Further embodiments include a non-transitory processor-readable medium on which is stored processor-executable instructions configured to cause a computing device to perform operations of the methods described above. Further embodiments include a communication system including a computing device configured with processor-executable instructions to perform operations of the methods described above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The word "exemplary" is used herein to mean "serving as an example, instance, or illustration." Any implementation described herein as "exemplary" is not necessarily to be construed as preferred or advantageous over other implementations.

Various embodiments provide an autonomous vehicle override control system for manually controlling aircraft, such as UAVs, that enables a pilot certified or qualified on a first type of autonomous vehicle to fly a second type of autonomous (that the pilot may not otherwise be certified/ qualified to operate) by translating manual control commands (such as stick and rudder movements in the case of aerial UAVs) entered by the pilot as appropriate for manually controlling the first type of UAV into appropriate manual override control commands provided to UAV of the second type such that the UAV performs in a manner that is both safe and consistent with the performance expected by the pilot. The control interface may also present instrument data of the UAV of the second type in a manner or display consistent with the first type of UAV, and thus in a manner that is familiar to the pilot. Various embodiments thus enable a pilot to take manual control of a UAV of a type that differs from the pilot's experience and knowledge.

The term "computing device" is used herein to refer to an electronic device equipped with at least a processor. Examples of computing devices may include mobile devices (e.g., cellular telephones, wearable devices, smart-phones, web-pads, tablet computers, Internet enabled cellular telephones, Wi-Fi® enabled electronic devices, personal data assistants (PDA's), laptop computers, etc.), personal computers, and server computing devices. In various embodiments, computing devices may be configured with memory and/or storage as well as networking capabilities, such as network transceiver(s) and antenna(s) configured to establish a wide area network (WAN) connection (e.g., a cellular network connection, etc.) and/or a local area network (LAN) connection (e.g., a wired/wireless connection to the Internet via a Wi-Fi® router, etc.).

Figure 2:
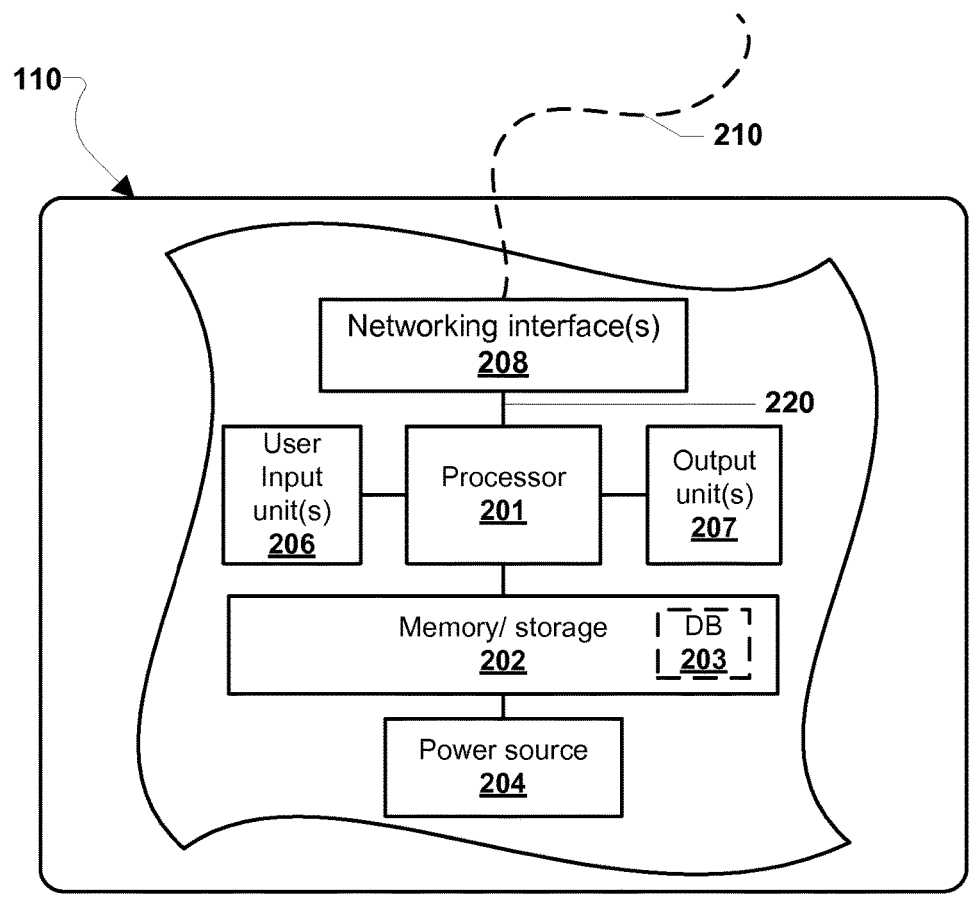
FIG. 2 is a component block diagram of an exemplary autonomous vehicle override control system suitable for use with various embodiments.

The term "autonomous vehicle override control system" used herein refers to a computing device configured to receive control inputs for various autonomous vehicles and generate corresponding override commands for other types of autonomous vehicles. Components of an exemplary autonomous vehicle override control system are illustrated in FIG. 2.

Figure 7:
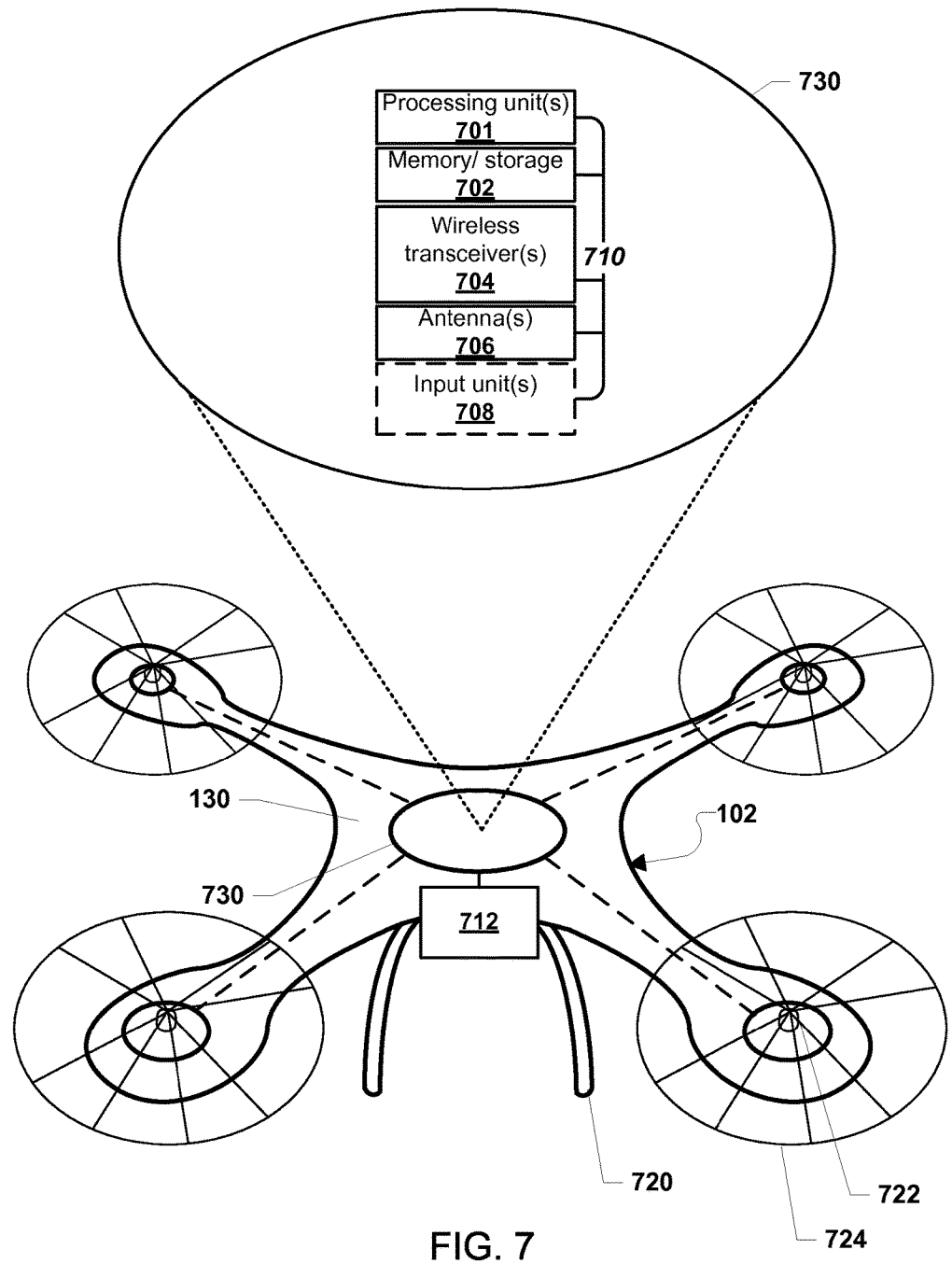
FIG. 7 is a component block diagram of an aerial unmanned autonomous vehicle (UAV) suitable for use with various embodiments.

The term "unmanned autonomous vehicle" (or "UAV") is used herein to refer to various types of autonomous vehicles (e.g., autonomous aircraft) that may not utilize local, human pilots. A UAV may be a vehicle that includes a computing device and may be capable of flying without any human interaction (i.e., autonomous) or with some human interaction (e.g., remotely providing flight instructions to be executed by a processing unit for takeoff and landings, etc.). For example, UAVs may include aerial vehicles of various design types capable of executing vertical lift-offs, such as "rotorcraft-type" UAVs configured with any number of rotors (e.g., single-rotor drones, multi-rotor drones, such as quadcopter drones having four rotors, etc.). Aerial UAVs may be of various structure or control types, such as a rotorcraft-type or a fixed-wing-type. An example of an aerial vehicle UAV is illustrated in FIG. 7; however, the embodiments are not limited to aerial vehicles and may be implemented in any mobile robotic or autonomous vehicle (e.g., ground, aquatic, and space vehicles) or other type (manned or unmanned) of vehicle.

The term "UAV type(s)" is used herein for convenience to refer to classes, categories, models, makes, designs, configurations, standards, and/or any other characteristics that may be used to differentiate various unmanned vehicles. While the various embodiments are pertinent to any type of unmanned autonomous vehicle, various embodiments are described with reference to aerial UAVs for ease of reference. However, the use of aerial UAVs as examples is not intended to limit the scope of the claims to autonomous aerial vehicles. In particular, UAV types may include "rotorcraft-type" (e.g., a quadcopter design, a helicopter design, etc.) and "fixed-wing-type" (e.g., an airplane design, etc.). For example, a first UAV type may refer to a first design (e.g., a rotorcraft-type UAV) and a second UAV type may refer to a second design (e.g., a fixed-wing-type UAV). As another example, a first UAV type may refer to rotorcraft-type UAV designed or manufactured by a first company and a second UAV type may refer to rotorcraft-type UAV designed or manufactured by a second company.

Some conventional systems may exist for assisting in the flight control of aerial vehicles. For example, some modern fly-by-wire flight control systems (e.g., within commercial airliners) may adjust a flight control system based on the current aircraft configuration (e.g., flap settings) and flight conditions (e.g., airspeed, temperature) to provide a consistent user interface for the pilot while avoiding unsafe attitudes. As another example, some conventional systems may limit the pitch, yaw, and/or roll of an aerial vehicle based on hard restrictions (e.g., governors or cut-offs) to maintain the aerial vehicle within the safe flying envelope of airspeed, attitude and altitude. However, such conventional systems do not enable a pilot trained to manually fly one type of aerial vehicle to take over manual control of a very different type of aerial vehicle.

Various embodiments provide methods, devices, systems, and non-transitory process-readable storage media for an autonomous vehicle override control system that enables a human pilot certified on one type of autonomous vehicle to pilot another type of autonomous vehicle with little or no training or certification. As a non-limiting example, the autonomous vehicle override control system may be a ground-based computing device in a flight control station (e.g., a military base, an operations center, etc.) that translates flight control input commands associated with a first aerial UAV type into override commands that may be used to control a target UAV of a second aerial UAV type.

The autonomous vehicle override control system may utilize the interface and controls (e.g., display, instrumentation, control stick, etc.) that are consistent with an autonomous vehicle of the first UAV type so that a remote pilot may not need to become familiar with the different requirements, mechanisms, and instrument layouts of the target UAV of the second UAV type. For example, the remote pilot may apply aileron and rudder inputs suitable/typical for a first UAV type (e.g., rotorcraft-type UAV) for which the remote pilot is certified, and in response the autonomous vehicle override control system may translate the inputs into commands for causing an autonomous target UAV of a different type (e.g., fixed-wing-type UAV) to accomplish similar aircraft attitude changes within safe control limits. Thus, the autonomous vehicle override control system may convert one form of aircraft control data into a second form that is suitable for providing streams of override instructions to the control system of the target UAV, allowing a pilot rated on the first UAV type to safely take direct manual control of the target UAV with behaviors consistent with what the remote pilot anticipates based on previous experiences with the first UAV type.

In various embodiments, the autonomous vehicle override control system may utilize a translation database that includes control models for a plurality of UAV types. Each control model may include aircraft profiles, parameters for control dynamics, specifications, control laws or rule sets, characteristics, simulation routines or simulation data, measurements, component lists, control schemes, and other stored data associated with particular UAV types. Using control models from the translation database, the autonomous vehicle override control system may analyze input data (or input commands) for the first UAV type to identify the pilot's intended actions or effects for a UAV of the first UAV type (referred to herein as physical movements). For example, the autonomous vehicle override control system may evaluate the input commands using the control model for the first UAV type to identify physical movements of the UAV (e.g., changes to thrust, breaking, flaps, rolls, banking, etc., that the pilot qualified on that type of UAV) to perform based on the pilot's input commands. The determined physical movements that the pilot intended for the UAV may be in a format suitable for interfacing with another control model for purposes of determining appropriate translated control commands. In some embodiments, the interface format may involve determining physical movements of a "virtual UAV" of the first type of UAV by modeling movements of the UAV in response to the pilot's inputs, although other standard data formats may be used. For ease of reference, the intermediate data format is referred to as a virtual UAV.

Using a second control model corresponding to the second UAV type of the target UAV, the autonomous vehicle override control system may map the identified physical movements of the virtual UAV to similar actions or movements that the target UAV can perform that would be consistent with the remote pilot's input commands, consistent with the target UAV's control characteristics while remaining in a safe operating configuration (e.g., stable flight in the case of aerial UAV). The autonomous vehicle override control system may use the second control model to identify override commands associated with the target UAV that would result in the mapped physical movements of the target UAV. Suitable manual override commands may be generated for the target UAV using the second control model that are safe and feasible (i.e., within the target UAV's stable control envelope) such that pilot inputs that would be unsafe, impossible, or otherwise inappropriate for the target UAV are not implemented or are translated into safe/achievable inputs. For example, an input command to roll the virtual UAV of the first UAV type to a 60-degree bank may be inhibited if the target UAV of the second UAV type is not equipped to handle that angle, is not stable, or could be damaged at that angle of banking under the current airspeed conditions. In other words, using the control models, the autonomous vehicle override control system may identify commands that cause appropriate actions or effects for the target UAV that are the same or similar to the actions or effects that the remote pilot intended for the UAV based on the pilot's interaction with the first type of UAV.

In some embodiments, based on the control models of the translation database, the autonomous vehicle override control system may convert inputs to outputs having more or less magnitude characteristics. For example, the autonomous vehicle override control system may convert a single input command to change the altitude on a fixed-wing-type UAV to several override commands that would control numerous engines on a rotorcraft-type UAV to change the altitude to a similar degree. In other words, the autonomous vehicle override control system may manipulate input commands into an appropriate form, number, magnitude, and/or sequence for use by the target UAV. The autonomous vehicle override control system may also interpret input commands in a linear or non-linear fashion. For example, a small value for an input command for the virtual UAV of the first UAV type may result in an override command with a large value for the target UAV of the second UAV type. Such conversions may be context-based, such that certain input commands in combination or sequence with other previous/subsequent input commands may result in different override commands. In some cases, autonomous navigation algorithms may be applicable between different unmanned autonomous systems without much tuning after feeding the data through a translation/normalization system according to various embodiments. For example, techniques according to various embodiments may be used to translate in between rotorcraft-type and fixed-wing-type autopilot systems commands.

The following is a non-limiting illustration of an exemplary translation using the example of an aerial UAV. In a conventional example flight approach, a fixed-wing-type UAV may be configured to fly from a first point to a second point using a first heading, from the second point to a third point using a second heading, and then may fly using a third heading on a final approach into a landing field/strip. As such approaches and procedures may not currently exist for rotorcraft-type UAV, an autonomous vehicle override control system may be used to translate the fixed-wing-type UAV's flight approach for use by a rotorcraft-type UAV (e.g., generate override commands causing a rotorcraft-type UAV to fly an approach to the landing field/strip by translating fixed-wing-type UAV autonomous navigation commands). For example, the rotorcraft-type UAV may receive override commands that configure the rotorcraft-type UAV to use the front of the airframe as a reference point and execute a yaw/turning motion to turn the rotorcraft-type UAV to the various appropriate headings, and then fly forward. As another example, a rotorcraft-type UAV may receive override commands that configure the rotorcraft-type UAV to keep the rotorcraft-type UAV pointed toward an arbitrary angle to improve efficiency/performance, and the rotorcraft-type UAV may travel using a strafing motion along a point-to-point course taken from the fixed-wing-type UAV's flight approach plan. Further, the override commands may be transmitted to the rotorcraft-type UAV based on data from a translation/normalization system from the fixed-wing-type UAV that indicate turning information while moving forward to the various points that may also be used by the rotorcraft-type UAV, as the mechanics of the motions may be similar.

In various embodiments, the autonomous vehicle override control system may include or otherwise be coupled to display and/or input elements associated with one or more different UAV types or a generic UAV. For example, the autonomous vehicle override control system may render gauges, dials, read-outs for the first UAV type that are more, less, and/or different than instrumentation for the target UAV. As another example, the autonomous vehicle override control system may be connected to a control stick or gamepad to receive input data associated with the first UAV type, regardless of the typical control input methods for the second UAV type of the target UAV. In other words, gauges, instruments, controls, and sensor outputs may be presented to the remote pilot in a manner that is consistent with the first UAV type with which the pilot is familiar, and not the displays of the second UAV type of the target UAV with which the pilot is not familiar.

In some embodiments, the autonomous vehicle override control system may have a dynamic display subsystem configured to render digital representations of instrumentation associated with any active UAV type for which the remote pilot is certified (e.g., licensed, capable of flying, etc.). For example, in response to the remote pilot selecting an "input" UAV type for which the remote pilot is certified (e.g., picking a preferred UAV control scheme), the dynamic display may update the position, size, and types of visual elements rendered on one or more display units coupled to the autonomous vehicle override control system in order to replicate the look and feel of the currently selected "input" UAV type.

In some embodiments, the autonomous vehicle override control system may adjust control models or other data used to identify physical movements of the first and/or target UAVs based on pilot experience with the first and/or target UAV types. For example, based on pilot profile data indicating one or more of a time spent controlling a UAV of the second UAV type and a diversity of maneuvers executed with regard to the UAV of the second UAV type, the autonomous vehicle override control system may configure the control models used to perform simulations such that any input commands received via an control input device may be filtered to suit the remote pilot's abilities at that given time. Such experience data may be dynamic, as the autonomous vehicle override control system may update a remote pilot's profile over time based on interactions with various UAV types. In this way, the autonomous vehicle override control system may enable different override commands to become available to each remote pilot as the pilots become more experienced with target UAV control schemes, thus enabling pilots to potentially perform more sophisticated maneuvers.

In some embodiments, the autonomous vehicle override control system may adjust control models or other data used to identify physical movements and/or override commands based on current conditions at the target UAV. For example, the autonomous vehicle override control system may adjust the possible maneuvers for the target UAV due to weather conditions at the target UAV or current mechanical states of the various components of the target UAV. As another example, based on data received from the target UAV indicating one or more of sensor data from the target UAV, settings of instruments of the target UAV, and weather conditions near the target UAV, the autonomous vehicle override control system may adjust control models such that the generated override commands use the full or partial capabilities of the target UAV at that time and at the current operating location.

In various embodiments, the autonomous vehicle override control system may be one or more computing devices configured to execute at least a portion of the methods according to various embodiments described herein. In some embodiments, the autonomous vehicle override control system may be ground-based, such as one or more units in a control room setting. In some embodiments, some or all of the functionalities of the autonomous vehicle override control system may be located in computing devices positioned on the ground, in an autonomous vehicle, in a mobile facility, and/or any combination thereof. While various embodiments described herein refer to control systems for UAVs, the autonomous vehicle override control system of various embodiments may be configured to provide override commands to manned vehicles. For example, in times of emergency, the autonomous vehicle override control system may be configured to translate input commands for a rotorcraft-type UAV into override commands to control a manned aerial vehicle, such as a Cessna 172, thereby enabling an experienced aerial UAV pilot to provide emergency piloting controls for a manned aerial vehicle with an incapacitated pilot.

As an illustration of various embodiments, a remote pilot certified to fly a fixed-wing-type UAV (e.g., qualified, licensed, and/or otherwise capable of flying the fixed-wing-type UAV) may access the autonomous vehicle override control system to assume control over a rotorcraft-type (e.g., multi-rotor UAV) target UAV by logging into the system so that the system can select the proper first autonomous vehicle model, such as by providing a username, password, keycard, etc. The autonomous vehicle override control system may authenticate the remote pilot and confirm that the remote pilot is certified (or otherwise qualified) to fly the fixed-wing-type UAV. Knowing the pilot's certifications, the autonomous vehicle override command system may obtain from a database of control models a control model corresponding to the fixed-wing-type UAV that the pilot is qualified to fly. The autonomous vehicle right command system may also obtain from the database a control model corresponding to the rotorcraft-type target UAV that the pilot intends to control. The autonomous vehicle override command system may then configure the two control models so that pilot inputs that are provided in a manner consistent with the fixed-wing-type UAV are translated into corresponding and safe control inputs for the target UAV.

With the autonomous vehicle override command system, the remote pilot may provide input commands suitable for the fixed-wing-type UAV, such as by moving a control stick control input device and/or providing input data via other instruments associated with the fixed-wing-type UAV (e.g., levers, buttons, dials, etc.). The autonomous vehicle override control system may provide feedback to the remote pilot using the instrumentation and read-outs of the fixed-wing-type UAV. Based on the provided input data from the remote pilot, the autonomous vehicle override control system may identify how a virtual fixed-wing-type UAV would move in the air in response to the provided inputs from the remote pilot, such as by running a simulation using a control model corresponding to the fixed-wing-type UAV type. Having identified the movements of the virtual UAV, the autonomous vehicle override control system may identify similar movements that could be safely accomplished by a UAV of the same UAV type as the rotorcraft-type target UAV. For example, using stored data of the specifications, schematics, and other flight abilities of both a fixed-wing-type UAV and the rotorcraft-type UAV, the autonomous vehicle override control system may find mechanical differences/similarities between the two aerial autonomous vehicles, map control surfaces, and determine physical movements for the target UAV (e.g., roll/yaw/pitch adjustments) to match the behavior of the virtual fixed-wing-type aerial UAV.

Having determined corresponding and safe maneuvers of that target UAV, the autonomous vehicle override control system may identify the control commands to the target UAV that will result in operating behaviors similar to those intended by the pilot for the virtual UAV. For example, the autonomous vehicle override control system may perform a reverse-simulation using physical movements of the target UAV and a corresponding control model. The autonomous vehicle override control system may transmit the identified control commands to the target UAV as override commands formatted to take over control of the target UAV from the target UAV's autopilot. For example, the override commands may cause the target UAV to perform a banking maneuver, increase speed, change elevation, and/or begin a landing maneuver.

The methods and systems according to various embodiments may reduce costs and time for UAV pilots. For example, with the autonomous vehicle override control system, a remote pilot certified (e.g., qualified, licensed, and/or otherwise capable) to fly only one type of UAV may be immediately capable of taking control of any of a plurality of UAVs of different types in a fleet. Further, by adjusting control of the target UAV to the capability of the remote pilot as opposed to the target UAV, the remote pilot may be more efficient and safe while controlling the target UAV. The methods and systems according to various embodiments may also improve the functionality of existing control systems by providing overrides that may be used to correct unwanted or unexpected autonomous operations. For example, if the control management routines of an autonomous UAV become corrupted, hacked, or otherwise inoperable, override commands transmitted by the autonomous vehicle override control system may enable a remote human pilot to overcome the faulty actions of the autonomous UAV until the problem has been resolved.

The methods and systems according to various embodiments may provide dynamic control systems that enable remote pilots of different certifications, licenses, capabilities, and/or experiences to provide override commands for controlling autonomous vehicles of different types. Unlike some conventional systems that utilize common or generic controls, the systems according to various embodiments may utilize controls, instrumentation, and control input devices native to the various control systems with which a remote pilot is most familiar. For example, based on whatever certification a remote pilot may have, the systems according to various embodiments may utilize a rotorcraft-type UAV input control setup or a fixed-wing-type UAV control setup in order for the remote pilot to provide input commands that eventually override the operations of an available target UAV of various UAV types. Further, unlike some control systems, the methods and systems according to various embodiments may provide a ground-based autonomous vehicle override control system that is configured to transmit override commands to UAVs, such as via radio frequency (RF) transmissions from a transmitter. In other words, the autonomous vehicle override control system outputs override controls that are already appropriately calculated and configured for directly controlling the target UAV using a native communication supported by the target UAV.

Some conventional systems may provide a direct mapping of input data to output data for controlling vehicles, such as by using one-to-one conversions or truncation operations to fit inputs to target parameter ranges. The methods and systems according to various embodiments may or may not utilize direct mapping schemes based on the various control models corresponding to virtual UAVs and target UAVs to be controlled.

Additionally, methods and systems according to various embodiments may also utilize control models that account for non-linear conversions of input commands. For example, instead of merely interpreting a "flaps down X percent" input command of a first UAV type as a linearly-adjusted "flaps down Y percent" output command of a target UAV type, the methods and systems according to various embodiments may evaluate the remote pilot's previous control experiences with the target UAV type and/or the first UAV type to identify a likely intended action, as well as current weather or operating states of the target UAV to identify a suitable but safe corresponding override command that is sent to the target UAV.

Further, unlike some conventional systems that use autopilot techniques to normalize or delimit inputs to predefined ranges or envelopes for various UAV controls, the methods and systems according to various embodiments are not simple, corrective operations that overcome remote pilot error. Instead, the methods and systems according to various embodiments may translate input commands of one UAV type to analogous commands of another UAV type that may be similar or completely dissimilar to the input commands. In this way, with adept remote pilots, challenging behaviors of target UAVs may be accomplished, as input commands for a first UAV type that may be outside of the range for commands of a second UAV type may be converted via the control models to override commands that accomplish the same effect as the input commands without exceeding the safe control envelope of the second UAV type. Further, the methods and systems according to various embodiments are not a standard proportional-integral-derivative (PID) loop or controller, but instead allow for dynamically converting input commands from a first UAV type to another type of autonomous vehicle. Various embodiments described herein reference various forms of UAVs. However, it should be appreciated that embodiment techniques may not be limited to unmanned autonomous vehicles. For example, embodiment methods described herein may be applied to any mobile robotic vehicle (e.g., ground, aquatic, space, etc.) and/or other vehicle types (e.g., manned or unmanned).

Figure 1:
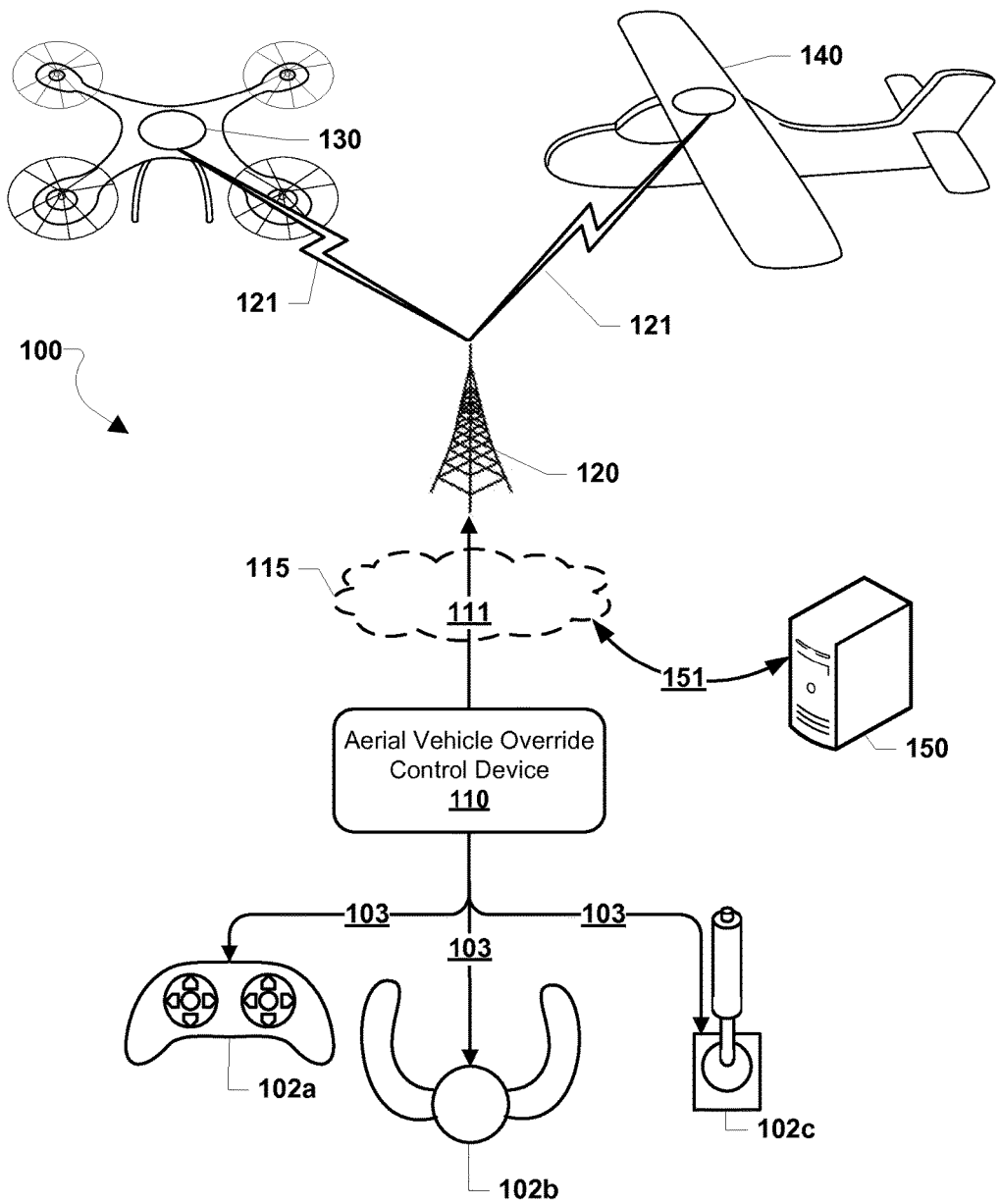
FIG. 1 is a component block diagram of a communication system that includes an autonomous vehicle override control system suitable for use with various embodiments.

FIG. 1 illustrates a communication system 100 that includes an autonomous vehicle override control system 110 configured to generate and provide override commands to one or more autonomous vehicles, such as a rotorcraft-type UAV 130 (e.g., a quadcopter) and/or a fixed-wing-type UAV 140. For example, the communication system 100 may be suitable for enabling a remote pilot to provide override commands to cause an autonomous UAV (e.g., the rotorcraft-type UAV 130, etc.) to change course, land, change speed, deliver a payload, and/or other midair maneuvers. In some embodiments, such a communication system 100 may be used for overriding or supplementing autonomous functionalities of autonomous UAVs 130, 140 (e.g., autopilot routines, etc.).

The autonomous vehicle override control system 110 may be a computing device including various networking components (e.g., as described with reference to FIG. 2). For example, the autonomous vehicle override control system 110 may utilize various software instructions, modules, logic, circuitry, and/or routines to standardize telemetry and control data from remote pilots and multiplex the data into the appropriate control data for a target type of UAV.

The autonomous vehicle override control system 110 may include various interfaces, readouts, and communication functionalities for exchanging data with a plurality of control input devices 102a-102c used for receiving input data (e.g., inputs for changing the elevation, pitch, yaw, roll, speed, etc.). For example, such control input devices 102a-102c may be connected to the autonomous vehicle override control system 110 via wired or wireless connections 103. The control input devices 102a-102c may be of varying configurations and/or associated with different types of UAVs or UAV control schemes. For example, the first control input device 102a may be a gamepad control input device, the second control input device 102b may be a steering wheel control input device, and the third control input device 102c may be a stick and rudder peddle flight control input device. The control input devices 102a-102c shown in FIG. 1 are merely for illustration and thus are not intended to be limiting, as in various embodiments the autonomous vehicle override control system 110 may include any number and combination of input control devices, displays, and mechanisms that may correspond to various types of UAV input controls.

In some embodiments, the autonomous vehicle override control system 110 may be coupled to various external and/or internal transmitters, antenna, and/or other components for exchanging wireless signals with deployed UAVs. For example, the autonomous vehicle override control system 110 may be connected via a wired or wireless connection 111 to an external transmitter 120 configured for exchanging messages with UAVs. In some embodiments, the connection 111 may be a direct connection between the autonomous vehicle override control system 110 and the transmitter 120 or alternatively may be an indirect connection via a network 115, such as the Internet or a local area network (LAN). In some embodiments, the transmitter 120 may be included within the autonomous vehicle override control system 110.

The UAVs 130, 140 may be configured with various communication functionalities, such as long-range radio transceivers and antenna (e.g., 704, 706 in FIG. 7). Accordingly, the transmitter 120 may exchange wireless radio signals 121 with the UAVs 130, 140, such as transmitting override commands to the rotorcraft-type UAV 130 and/or the fixed-wing-type UAV 140, receiving current conditions data (e.g., current speed; altitude; control status data; location; orientation; weather data, such as temperature, wind velocity, presence of precipitation, etc., from on-board sensors, etc.) from the rotorcraft-type UAV 130 and/or the fixed-wing-type UAV 140. In some embodiments, the transmitter 120 and/or the UAVs 130, 140 may exchange messaging via satellite signals (not shown).

In some embodiments, the autonomous vehicle override control system 110 may be configured to exchange data with various remote data sources, such as a remote server 150 connected to the network 115 via a wired or wireless connection 151. In some embodiments, the remote server 150 may include a database of control models, profile data of remote pilots and/or particular UAVs, and/or other information required for generating and transmitting override commands to the UAVs 130, 140. For example, the autonomous vehicle override control system 110 may receive from the remote server 150 current weather data, remote pilot profile data, UAV control schemes or control laws for the rotorcraft-type UAV 130 or the fixed-wing-type UAV 140, and/or other data for use with various embodiments described herein. In some embodiments, the autonomous vehicle override control system 110 may transmit override commands to the remote server 150 for delivery via the transmitter 120 to the UAVs 130, 140.

FIG. 2 illustrates an exemplary autonomous vehicle override control system 110 according to various embodiments. With reference to FIGS. 1-2, an exemplary autonomous vehicle override control system 110 may include a processor 201 configured with processor-executable instructions to perform operations of various embodiments. In some embodiments, the processor 201 may be or include one or more multicore integrated circuits designated for general or specific processing tasks. The processor 201 may be coupled to various other modules or functionalities via a wired or wireless connectivity, such as via a bus 220 or other circuitry. In particular, the processor 201 may be connected to an internal memory 202 (and/or other storage), a power source 204 (e.g., a battery, a rechargeable lithium battery, a power plug capable of interfacing with a conventional power outlet, etc.), user input unit(s) 206 (e.g., a keyboard/keypad, a control stick, rudder pedals, a touchpad, a peripheral device connection interface configured to accept one or more types of connection, such as USB, etc.), and output unit(s) 207 (e.g., an LED screen, bulb(s), touch screen, a speaker, etc.). For example, the user input unit(s) may include the control input devices 102a-102c.

The internal memory 202 may be volatile or non-volatile memory, and may also be secure and/or encrypted memory, or unsecure and/or unencrypted memory, or any combination thereof. In some embodiments, the memory 202 (or other storage) may store various control databases 203, for example, such as relational databases storing a plurality of data records and rule set files related to pilots and aerial vehicles. For example, such data records may include profile data of various remote pilots, control models for various types of UAVs, contact information for various deployed UAVs, and other data related to override commands for UAVs. In some embodiments, such databases 203 may be stored remotely, such as on a remote server accessible to the autonomous vehicle override control system 110 via the Internet or other network.

In some embodiments, the autonomous vehicle override control system 110 may include various networking interfaces 208 (and associated logic) connected to the processor 201. For example, the autonomous vehicle override control system 110 may include one or more radio transceivers and antenna (not shown) for exchanging signals with remote devices (e.g., remote servers, UAVs, external transmitters, etc.) via various transmission protocols, standards, mediums, and configurations (e.g., Wi-Fi®, etc.). In some embodiments, the autonomous vehicle override control system 110 may utilize one or more wired or wireless connections 210 to other devices or networks for enabling communications, such as an Ethernet connection to an Internet access point.

Figure 3:
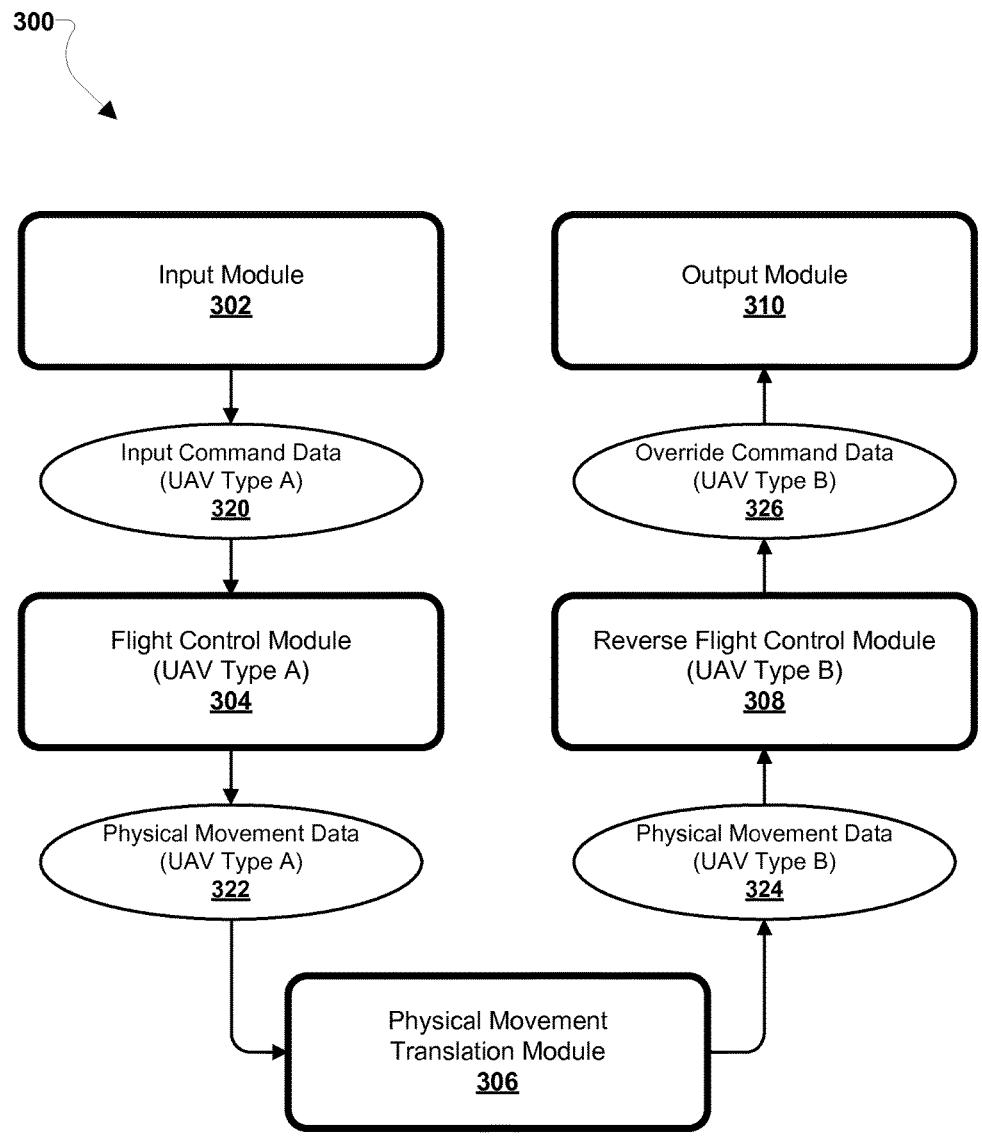
FIG. 3 is a component diagram of exemplary modules and data used by an autonomous vehicle override control system according to various embodiments.

FIG. 3 illustrates exemplary modules 302-310 and data 320-326 that may be used by an autonomous vehicle override control system (e.g., 110 in FIGS. 1-2) according to various embodiments. With reference to FIGS. 1-3, the various modules 302-310 may be instructions, routines, operations, circuitry, logic, software, and other functionalities that may be implemented by a processor of the autonomous vehicle override control system, such as the processor 201 of the autonomous vehicle override control system 110. For example, the modules 302-310 may be software routines performed via the processor 201. Further, the data 320-326 may be any inputs, parameters, register data, and/or other information that may be provided to and/or generated by the modules 302-310.

The autonomous vehicle override control system may include an input module 302 configured to receive and process input data from one or more control input devices (e.g., control input devices 102a-102c, 206). For example, the input module 302 may receive signals from a gamepad-type controller (e.g., the first control input device 102a) corresponding to a remote pilot's input for controlling a rotorcraft-type UAV (e.g., 130). As an example, the input module 302 may receive signals from a steering wheel controller (e.g., the second flight control input device 102b) corresponding to a remote pilot's input for controlling a fixed-wing-type UAV. In some embodiments, the input module 302 may be configured to apply control rules (or control laws) for a first UAV type (e.g., Type A) to received inputs from the control input devices in order to identify corresponding input commands appropriate for controlling a UAV of the first UAV type. In other words, the input module 302 may convert received input signals from control input devices into input command data suitable for controlling a UAV of the first UAV type.

The input commands may be passed as input command data 320 (or "Input Command Data (UAV Type A)" in FIG. 3) from the input module 302 to a control module 304 (or "Flight Control Module (UAV Type A)" in FIG. 3). The control module 304 may be configured to process (e.g., via the processor 201) the input command data 320, such as by simulating the behavior of a "Type A" UAV configured to perform the input commands received from the input module 302. The control module 304 may output physical movement data of the first UAV type 322 (or "Physical Movement Data (UAV Type A)" in FIG. 3). Using the example on an aerial UAV, the physical movement data of the first UAV type 322 may be data that indicates how the first UAV would change in altitude, yaw, roll, pitch, etc. based on the remote pilot's inputs via the flight control input devices connected to the autonomous vehicle override control system. Such physical movement data of the first UAV type 322 may also include data describing settings, states, and/or actions of actuators, motors, and/or other devices of the first UAV type (e.g., rotor motor activity levels, power draw, heat output, etc.).

The physical movement data of the first UAV type 322 may be provided to a physical movement translation module 306 that may be configured to process (e.g., via the processor 201) the physical movement data of the first UAV type 322 to generate physical movement data of a second UAV type 324 (or "Physical Movement Data (UAV Type B)" in FIG. 3). For example, the physical movement translation module 306 may convert an upward movement of a UAV of a first UAV type to a similar upward movement of a UAV of a second UAV type. In other words, the physical movement translation module 306 may convert the expected or simulated behavior of a first UAV (i.e., a virtual UAV of the first UAV type) into similar behaviors of a second UAV (i.e., a target UAV of the second UAV type).

The physical movement data of the second UAV type 324 may be provided to a reverse control module 308 (or "Reverse Flight Control Module (UAV Type B)" in FIG. 3). The reverse control module 308 may be configured to process (e.g., via the processor 201) the physical movement data of the second UAV type 324 in order to identify the control command(s) that should be transmitted to the target UAV of the second UAV type in order to produce the behavior indicated by the physical movement data of the second UAV type 324. In other words, the reverse control module 308 may work in the reverse direction of the control module 304 of the first UAV type, generating simulated control commands for the target UAV of the second UAV type based on an end behavior that is similar to the behavior calculated for the virtual UAV of the first UAV type, whereas the control module 304 of the first UAV type generates behavior data for the virtual UAV of the first UAV type based on input commands of the first UAV type. The reverse control module 308 may provide override command data of the second UAV type 326 (or "Override Command Data (UAV Type B)" in FIG. 3) to an output module 310 configured to transmit the override command data of the second UAV type 326 to the target UAV of the second UAV type. For example, the output module 310 may utilize a long-range transmitter (e.g., 120) to transmit the override commands to a UAV of the second UAV type in order to cause the UAV to operate according to a remote pilot's inputs.

Figure 4:
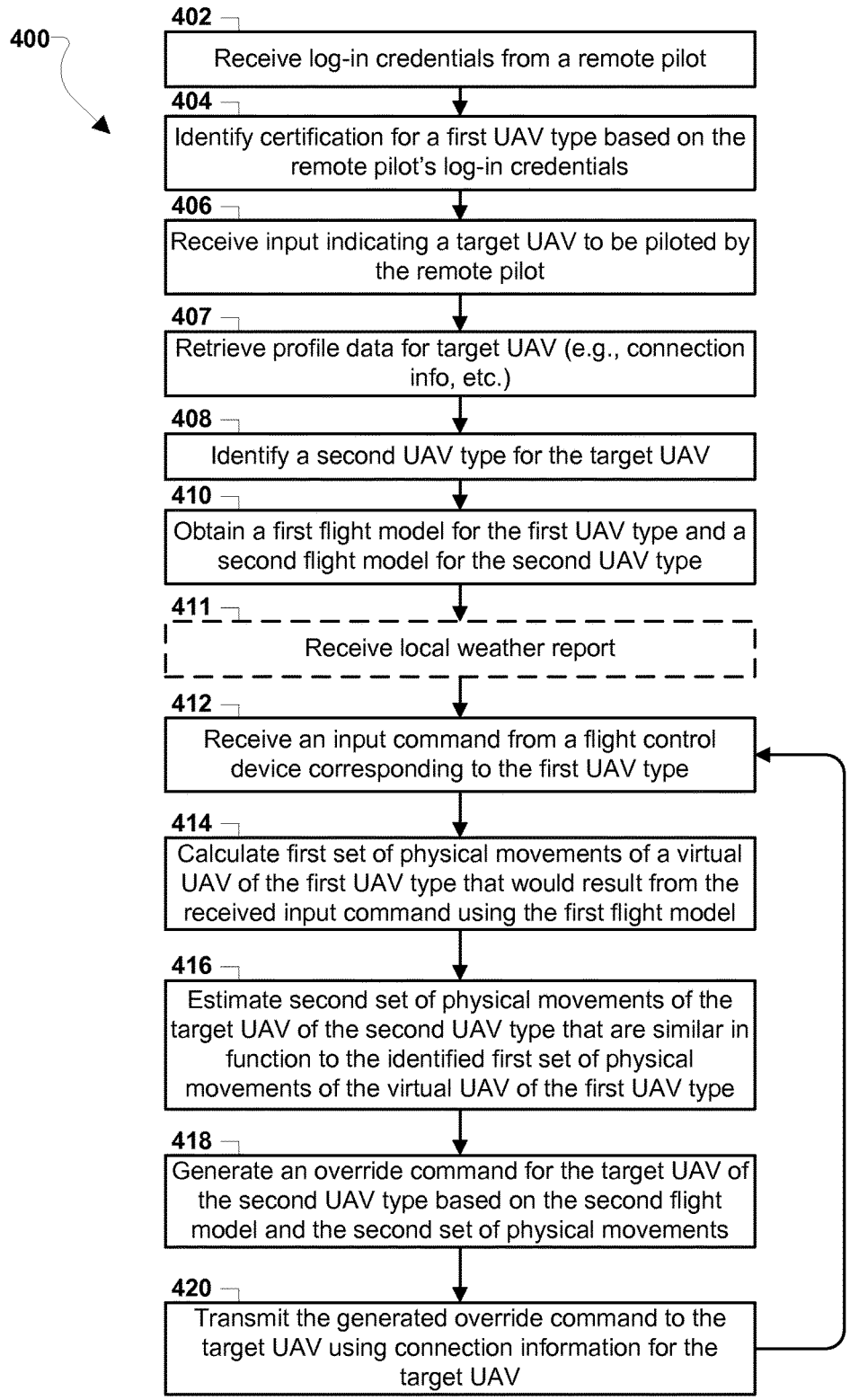
FIG. 4 is a process flow diagram illustrating a method for an autonomous vehicle override control system to transmit override commands to an unmanned aerial UAV of a second UAV type based on input commands associated with a first UAV type according to various embodiments.

FIG. 4 illustrates a method 400 for an autonomous vehicle override control system to transmit override commands to a target UAV of a second UAV type based on input commands associated with a first UAV type according to various embodiments. With reference to FIGS. 1-4, the method 400 may be performed by a processor of a computing device, such as the processor 201 of the autonomous vehicle override control system 110.

The processor of the autonomous vehicle override control system may receive login credentials from a remote pilot, in block 402. For example, the remote pilot may provide a username, gamepad controller access code or password, and/or other identifying or authenticating information via a keyboard, fingerprint reader, retina scanner, and/or other control input device connected to the autonomous vehicle override control system.

In block 404, the processor of the autonomous vehicle override control system may identify a certification of the remote pilot for a first UAV type based on the remote pilot's login credentials. For example, the autonomous vehicle override control system may perform look-up operations in a database of pilot profiles (e.g., local database coupled to the autonomous vehicle override control systems, remote database at the remote server 150, etc.) to identify a data record corresponding to the remote pilot login credentials that includes profile data indicating the remote pilot has one or more certifications, licenses, and/or capabilities for one or more autonomous vehicle types including the first UAV type. In some embodiments, the look-up operations may include the autonomous vehicle override control system transmitting a request to download data records from or otherwise perform the look-up at remote data sources (e.g., a remote data server 150 over the Internet or a local area network). In some embodiments, when the remote pilot has more than one certification (or license or capability), the autonomous vehicle override control system may perform operations to select a particular certification. For example, the selected certification from the plurality of certifications of the remote pilot may be based on preference data from the remote pilot's profile, a selection by the remote pilot, and/or based on the available control input devices currently connected to the autonomous vehicle override control system.

In block 406, the processor of the autonomous vehicle override control system may receive an input indicating a target UAV to be piloted by the remote pilot. For example, the autonomous vehicle override control system may receive a keyboard input of a target UAV identifier or a selection from a user interface (e.g., a drop-down list, etc.) that indicates the target UAV.

In block 407, the processor of the autonomous vehicle override control system may retrieve profile data for the target UAV. For example, the autonomous vehicle override control system may perform a look-up operation to retrieve profile data of the target UAV from a database of a plurality of UAVs, wherein the profile data may include information of the various specifications of the target UAV (e.g., UAV type or class, operating status, included equipment, etc.). In some embodiments, the profile data may be retrieved from a remote source (e.g., the server 150) and/or from a local data source (e.g., a database coupled to the autonomous vehicle override control system). In some embodiments, the profile data of the target UAV may also include connection information that may be used to transmit messages to the target UAV. For example, the connection information may be data within the profile of the target UAV that includes one or more of an access code, a communication channel, a transmission frequency, a transmission medium, identifiers of intermediary receiver devices required to contact the target UAV, and/or a message format. In block 408, the processor of the autonomous vehicle override control system may identify a second UAV type for the target UAV, such as by performing a look-up with the retrieved profile data.

In block 410, the processor of the autonomous vehicle override control system may obtain from memory (either local or remote) a first control model for the first UAV type and a second control model for the second UAV type. As described, the control models may be data sets stored in profiles associated with different UAV types and may include at least logic, routines, control rules, and/or applications configured to determine behaviors of UAVs based on provided input data (e.g., input commands associated with a particular UAV type). In other words, the control models may define information, control rules, and autonomous vehicle performance parameters that enable the autonomous vehicle override control system to calculate how a particular UAV type will maneuver and otherwise respond to input commands. As described, the control models may also be used in a reverse manner. For example, the control models may not only be used to identify a behavior of a UAV based on input commands, but may also be used to identify override commands based on the behavior of the UAV.

In some embodiments, the control models may include other data needed to determine how UAVs will maneuver and otherwise respond in response to input commands and/or what override commands may be used to evoke certain UAV behaviors. For example, the control models may include data indicating the various actuators, motors, and other physical elements that are controlled to accomplish various aerial maneuvers. As another example, the control models may include information about how the target UAV will respond to various weather or atmospheric conditions. In some embodiments, the autonomous vehicle override control system may retrieve the control models from a database of all supported control models. For example, the autonomous vehicle override control system may download or retrieve from memory the first and second control models by performing a look-up using the first and second UAV types identified based on the operations described with reference to blocks 404 and 408. In some embodiments, the control models may be implemented as the control modules 304, 308 (e.g., described with reference to FIG. 3).

In optional block 411, the processor of the autonomous vehicle override control system may receive weather reports or observations from an appropriate source, such as a weather bureau or a commercial weather forecasting center. Weather observations may be data regarding the weather conditions around or near the target UAV. In some embodiments, the weather reports or observations may be provided by the target UAV, such as in the form of temperature readings, images of clouds, and in airspeed, heading and location coordinates that the processor can use to calculate wind conditions around or otherwise near the target UAV.

In block 412, the processor of the autonomous vehicle override control system may receive an input command from a control input device corresponding to the first UAV type. For example, the autonomous vehicle override control system may receive signals from a control stick controller indicating the remote pilot has moved the control stick a certain number of degrees to one side. The autonomous vehicle override control system may interpret the signals from the control input device to correspond with one or more control commands as well as associated parameters. For example, the autonomous vehicle override control system may determine a control stick command corresponds to a command for adjusting yaw, pitch, roll, throttle, etc. of a UAV by a certain number of degrees in one direction. In some embodiments, the input command may be identified based on signals received from more than one control input devices connected to the autonomous vehicle override control system. For example, the autonomous vehicle override control system may receive input signals from one or more control input devices, such as the control input devices 102*a*-102*c* as described. In some embodiments, the autonomous vehicle override control system may receive and process the input using an input module 302 as described.

In block 414, the processor of the autonomous vehicle override control system may calculate first set of physical movement(s) of a virtual UAV of the first UAV type that would result from the received input command using the first control model. In some embodiments, using the first control model associated with the first UAV type, the autonomous vehicle override control system may perform a simulation to identify how a UAV of the first UAV type would respond given the input command. For example, the autonomous vehicle override control system may execute a program that references the specifications and control rules of a UAV of a first UAV type, as well as other factors, such as current weather conditions, and outputs data indicating how the UAV would move in response to the input command.

The first physical movements may be data that indicates changes to the position of the virtual UAV (e.g., altitude), to the orientation (e.g., pitch, yaw, roll, etc.), to the speed or throttle, and/or operating states or settings, such settings of an engine, a flap, an actuator, a rotor, and/or ballast. For example, the first physical movements may indicate whether the virtual UAV would be in a state of takeoff, landing, and/or activating/using on-board functionalities (e.g., sensors, clamps, doors, weapon systems, etc.). As another example, the autonomous vehicle override control system may identify a change in one or more of an altitude of the virtual UAV, a speed of the virtual UAV, a roll state, a pitch state, and a yaw state that is expected of the UAV given the control inputs in the current control and weather conditions.

In some embodiments, the first physical movements may include data regarding physical elements of the virtual UAV that would respond to the input command. For example, the first physical movements may include data indicating a certain actuator, engine, and/or other mechanical element of the virtual UAV would be moved, extended, rotated, activated, and/or otherwise adjusted a particular amount (e.g., rotated a certain number of degrees, turned 'on'/'off', pressurized a certain amount, extended a certain amount, etc.).

In block 416, the processor of the autonomous vehicle override control system may estimate a second set of physical movement(s) of the target UAV of the second UAV type that are similar in function to the identified first set of physical movements of the virtual UAV of the first UAV type. The autonomous vehicle override control system may compare the specifications of UAVs of the first and second UAV types to identify elements or components of the two UAV types that may have similar functions and thus may produce the same or similar movements in the two autonomous vehicle types. For example, the autonomous vehicle override control system may determine that a change in the orientation of a first set of flaps for the first UAV type is similar to a change in orientation of a second set of flaps for the second UAV type. In some embodiments, the autonomous vehicle override control system may identify the second set of physical movements using safety threshold or envelopes for the second type of UAV. For example, when the first set of physical movements indicate the virtual UAV has increased acceleration by a certain amount that is known to be unsafe for UAVs of the second UAV type, the autonomous vehicle override control system may identify an increase in acceleration that is similar to the first acceleration but still within the safety envelope for the second UAV type.

In some embodiments, the autonomous vehicle override control system may perform the operations of block 416 utilizing a physical movement translation module 306 (e.g., as described with reference to FIG. 3). In some embodiments, the autonomous vehicle override control system may identify the second set of physical movements as vastly different operations or maneuvers than the virtual UAV performed but that may accomplish a similar end result. For example, when the virtual UAV is a fixed-wing-type UAV, the autonomous vehicle override control system may identify a smooth landing approach based on the received input commands as corresponding to a vertical landing for a rotorcraft-type target UAV.

In block 418, the processor of the autonomous vehicle override control system may generate an override command for the target UAV of the second UAV type based on the second control model and the second set of physical movements. For example, the autonomous vehicle override control system may apply the data of the second set of physical movements to a control model that is configured to operate in a reverse manner than the first control model in block 414. For example, the autonomous vehicle override control system may perform a reverse simulation using the second control model to determine corresponding control commands. The override command may be similar to the input command in that the override command may indicate an action as well as various parameters for the target UAV to execute.

In some embodiments, the override command may be in a second format or language than the input command, such as a message or command format based on the specifications of the operating system executing on the target UAV. In some embodiments, the autonomous vehicle override control system may provide the second set of physical movement data as a call to a function to generate the override command.

In some embodiments, the autonomous vehicle override control system may perform the operations of block 418 utilizing a reverse control module 308 as described.

In block 420, the processor of the autonomous vehicle override control system may transmit the generated override command to the target UAV using a current wired or wireless communication link (e.g., a direct radio or cellular data network communication link) with the target UAV. For example, the autonomous vehicle override control system may transmit a message to a transmitter or directly to the target UAV that includes the one or more override commands generated based on the reverse control model. The autonomous vehicle override control system may transmit the override command using transmission characteristics that may be included within a retrieved profile of the target UAV, such as the particular frequency and any included authentication data or access codes that should be used in order to effectively communicate with the target UAV. In some embodiments, the autonomous vehicle override control system may perform the operations of block 420 utilizing an output module 310 as described.

The operations of blocks 412 through 420 of the method 400 may be performed in a continuous loop by the autonomous vehicle override control system as the pilot provides further control inputs.

Figure 5:
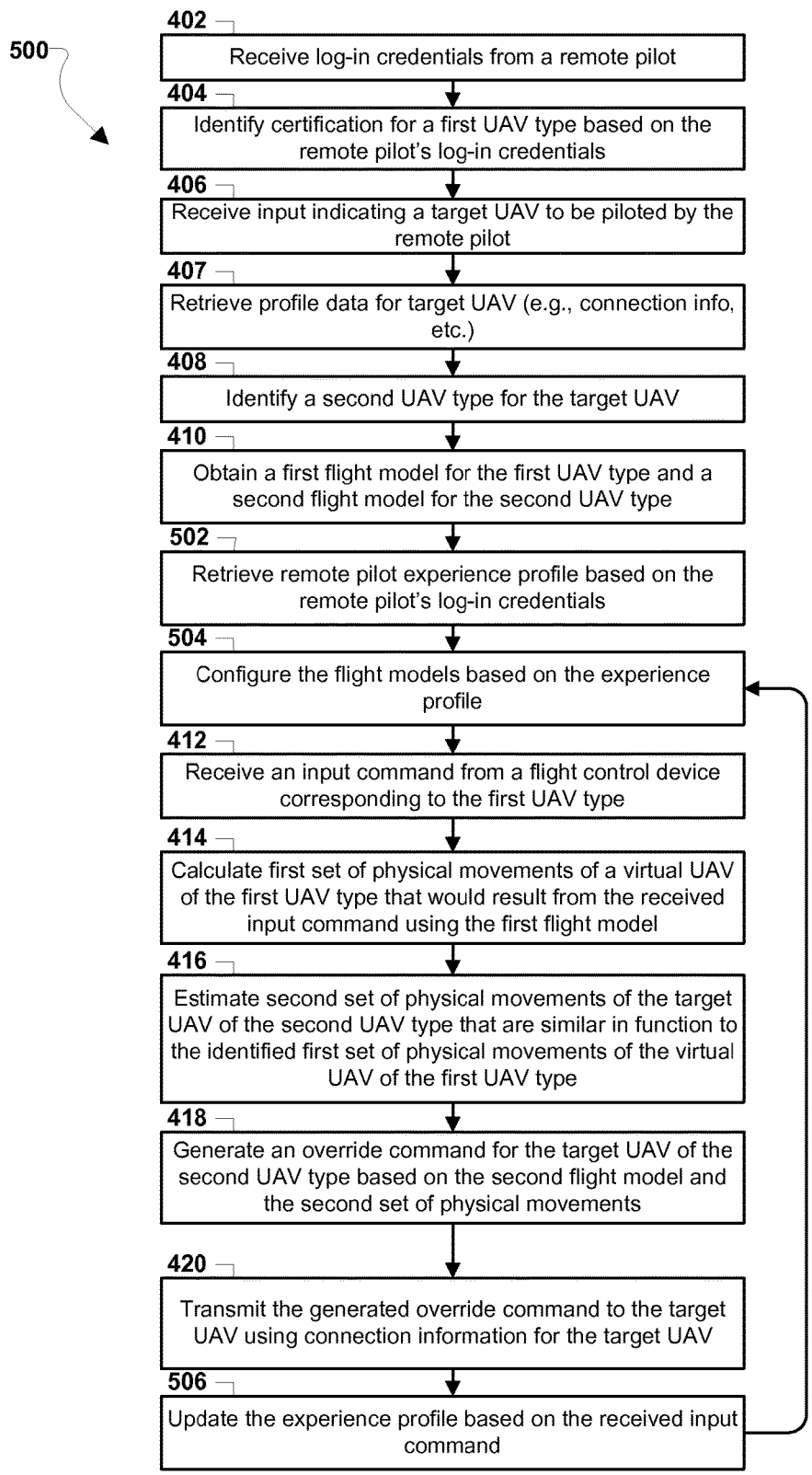
FIG. 5 is a process flow diagram illustrating a method for an autonomous vehicle override control system to adjust control models based on a remote pilot experience in order to generate override commands for a target UAV of a second UAV type according to various embodiments.

FIG. 5 illustrates a method 500 for an autonomous vehicle override control system to adjust control models based on a remote pilot experience in order to generate override commands for a target UAV of a second UAV type according to various embodiments. With reference to FIGS. 1-5, the method 500 may be similar to the method 400, except that the method 500 may include operations for adjusting, tweaking, and/or otherwise configuring the various control models associated with the first and second UAV types based on previous experiences of the remote pilot with the autonomous vehicle override control system. For example, based on stored data indicating how fast the remote pilot has previously provided input commands for a certain first UAV type and/or for a certain target UAV type, the autonomous vehicle override control system may interpret subsequent input commands differently (e.g., assign a greater change in the operations of the target UAV). The operations of blocks 402-420 may be similar to the operations of like numbered blocks of the method 400 as described.

In block 502, the processor of the autonomous vehicle override control system may retrieve remote a pilot experience profile (e.g., from the server 150) based on the remote pilot's login credentials. For example, when authenticating the remote pilot based on an entered password or identifier, the autonomous vehicle override control system may retrieve a data record associated with the remote pilot's identifier and that includes historical data corresponding to the remote pilot's previous uses of the autonomous vehicle override control system (or similar autonomous vehicle override control system units). The experience profile may include performance data of the remote pilot, success rates related to particular UAV types or maneuvers, total time logged in with regard to the target UAV and/or the first UAV type, biometrics data for the remote pilot over time (e.g., psychological information, blood pressure, perspiration data, etc.), and other data that may be used by the autonomous vehicle override control system to determine how proficient the remote pilot is with regard to the various UAVs supported by the autonomous vehicle override control system routines. In some embodiments, the pilot experience profile may be retrieved by the autonomous vehicle override control system from a local data source (e.g., a local database, storage device connected to the autonomous vehicle override control system, etc.) and/or from a remote data source (e.g., a cloud server, remote database, the server 150, etc.).

In block 504, the processor of the autonomous vehicle override control system may configure the first and second control models based on the pilot's experience profile. For example, the autonomous vehicle override control system may adjust the sensitivities, thresholds, and/or available maneuvers for the virtual UAV based on the remote pilot's previously provided inputs to the autonomous vehicle override control system. In some embodiments, the autonomous vehicle override control system may evaluate the experience data in order to determine a probability the remote pilot is actually attempting or capable of attempting more complex, dangerous, and/or otherwise more sophisticated maneuvers with the virtual UAV.

For example, based on the number of logged control time with the virtual UAV, the autonomous vehicle override control system may determine that input signals from a control stick may not correspond to a very sophisticated barrel roll or other maneuver as the remote pilot only has a minimum amount of hours of control time. In such cases, the autonomous vehicle override control system may be configured to re-interpret the input commands to include inputs more appropriate for a pilot having the experience of the remote pilot. For example, instead of a barrel roll, the autonomous vehicle override control system may interpret a control stick input as a small change in the roll (e.g., 45-degree bank) of the virtual UAV. As another example, when the remote pilot is determined to be very experienced with the virtual UAV type, the autonomous vehicle override control system may open up all potential midair maneuvers to the remote pilot, allowing input commands to cause more extreme actions in the virtual (and potentially) the target UAVs.

The following is a non-limiting illustration of such configuration operations. A pilot certified to fly a Beechcraft® Bonanza BE35-model fixed-wing aerial vehicle (e.g., qualified, licensed, and/or otherwise capable) may indicate such to an autonomous vehicle override control system, such as via a login procedure. The autonomous vehicle override control system may retrieve a first control model for the BE35-model and a second control model of a target UAV having similar operating characteristics (e.g., BE33-model, BE36-model, etc.). Although the two autonomous vehicles may be similar, there may be slight differences in the control parameters of each, and therefore the autonomous vehicle override control system may configure the control models to account for the pilot providing inputs for the first control model that differ slightly from what is optimal for the second control model. However, the autonomous vehicle override control system may record and analyze the pilot's gradual improvement with flying experience. For example, the pilot's inputs provided to the autonomous vehicle override control system may become closer and closer to the native controls for the target UAV as the pilot becomes more acquainted with the target UAV over time. Such pilot improvements may result in the amount of translations of pilots inputs to control commands become less significant over time so that, eventually, the autonomous vehicle override control system may generate override command sets that are minimally-translated from the first control model to the second control model just as if the pilot had been trained to pilot the target UAV.

In response to performing the transmission operations of block 420, the processor of the autonomous vehicle override control system may update the experience profile based on the received input command, in block 506. For example, the autonomous vehicle override control system may update the experience data with information indicating the remote pilot provided the input commands for the virtual UAV, the complexity of the input commands, and/or the amount of time in between receiving input commands.

The updates to the experience profile may indicate the remote pilot's improvement in piloting the target UAV (or lack thereof) based on the remote pilot's inputs. For example, in response to receiving input commands that the target UAV is not capable of performing and/or that the remote pilot is currently unqualified to provide to the target UAV (e.g., the remote pilot made a poor or catastrophic control decision), the autonomous vehicle override control system may degrade the remote pilot's profile by lowering a score or experience rating or otherwise changing the profile to indicate no positive experience has been gained by the remote pilot. As another example, in response to receiving "correct" or conservative input commands for the target UAV (e.g., successfully completing a maneuver, etc.), the autonomous vehicle override control system may adjust the remote pilot's experience profile by increasing a score or experience rating, thereby potentially hastening a training process. In some embodiments, the autonomous vehicle override control system may degrade the profile based on an amount of time the remote pilot is not using the system.

In this way, the autonomous vehicle override control system may continually evaluate the remote pilot's experiences and provide data that may intelligently improve the physical movements that may be generated in response to the user's inputs over time.

The operations of blocks 504 through 506 of the method 500 may be performed in a continuous loop by the autonomous vehicle override control system as the pilot provides further control inputs and the pilot's experience changes.

Figure 6:
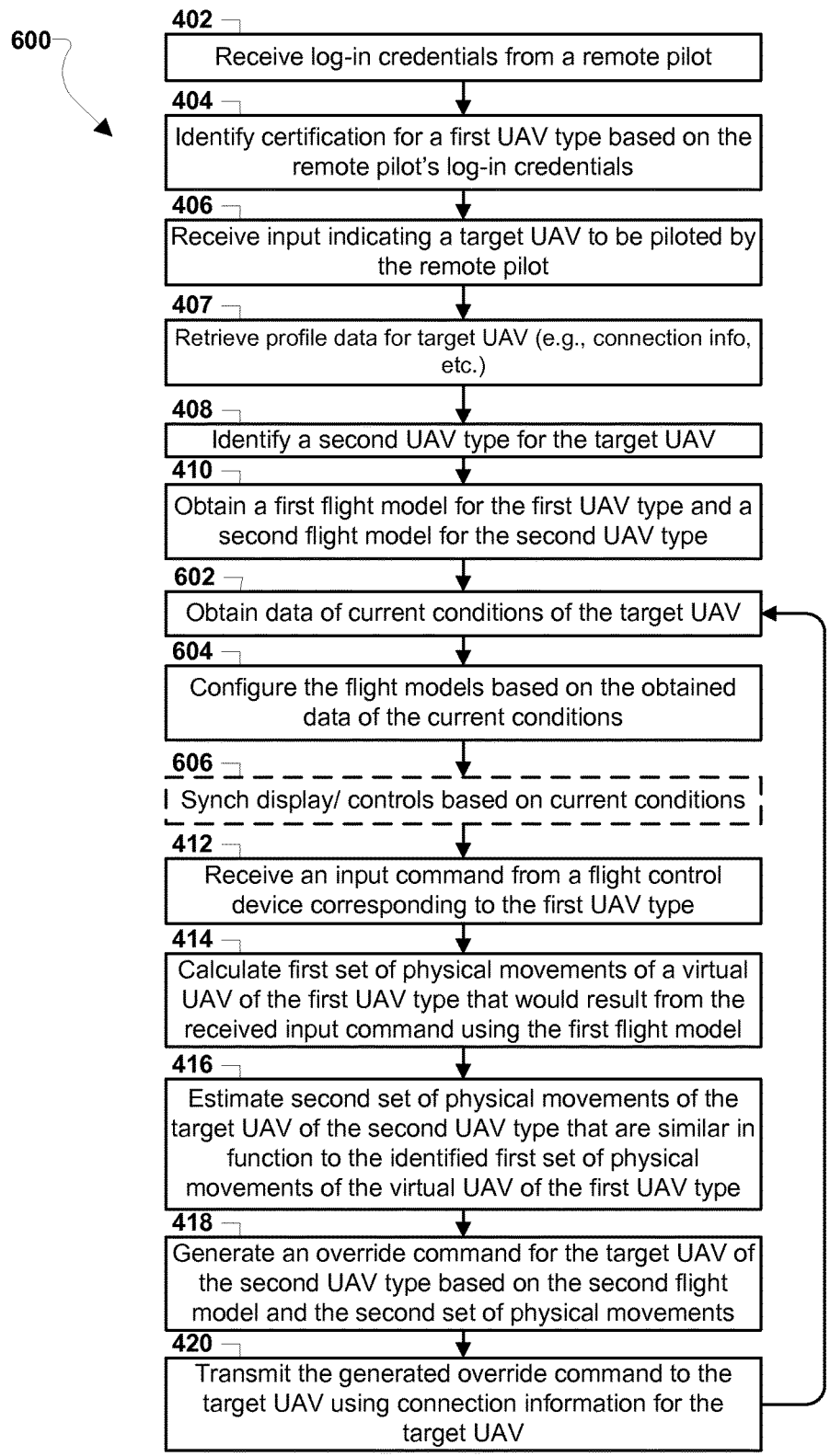
FIG. 6 is a process flow diagram illustrating a method for an autonomous vehicle override control system to adjust control models based on current conditions of a target UAV of a second UAV type in order to generate override commands for the target UAV according to various embodiments.

FIG. 6 illustrates a method 600 for an autonomous vehicle override control system to adjust control models based on data of current conditions at a target UAV of a second UAV type in order to generate override commands for the target UAV according to various embodiments. With reference to FIGS. 1-6, the method 600 may be similar to the method 400 except that the method 600 may include operations for adjusting, tweaking, and/or otherwise configuring the various control models associated with the first and second UAV types based on current conditions of the target UAV. For example, based on sensor data (e.g., current speed; altitude; control status data; location; orientation; and weather data, such as temperature, wind velocity, presence of precipitation, etc., from on-board sensors) provided by the instruments within the target UAV and/or data received from other devices near the target UAV, the autonomous vehicle override control system may change simulation parameters and/or feedback to the remote pilot in order to produce more accurate simulations of UAV performance. The operations of blocks 402-420 may be similar to the operations of like numbered blocks of the method 400 as described.

In block 602, the processor of the autonomous vehicle override control system may obtain data of the current conditions of the target UAV, such as sensor data from the target UAV. For example, the autonomous vehicle override control system, directly or indirectly, may receive messages via one or more networking interfaces that indicate the current instrument settings or readings of the instruments of the target UAV. As another example, based on incoming RF signals from the target UAV, the autonomous vehicle override control system may receive data indicating that the target UAV is currently encountering heavy winds, rain, lighting, air pressure, and/or other weather or atmospheric conditions.

In block 604, the processor of the autonomous vehicle override control system may configure the first and second control models based on the obtained data of the current conditions of the target UAV (e.g., sensor data). For example, to adjust the simulation used to determine how the virtual UAV would move in response to the user's input command(s), the autonomous vehicle override control system may change simulation parameters that affect the wind resistance and/or the movement tolerance that the virtual UAV may withstand given these conditions.

In optional block 606, the processor of the autonomous vehicle override control system may synchronize displays (e.g., read-outs, renderings, instrument settings, etc.) and/or controls (e.g., control stick feedback settings, etc.) coupled to or otherwise used with the autonomous vehicle override control system based on the current conditions of the target UAV. For example, if the target UAV is an aerial vehicle that is already in mid-flight and banking, the autonomous vehicle override control system may perform synching operations to render the virtual UAV on a screen such that the virtual UAV is depicted as already in the air and banking. As another example, when the target UAV is experiencing turbulence or weather conditions that affect the handling of the target UAV, the autonomous vehicle override control system may configured the controls accessible to the remote pilot such that handling is similarly affected for the virtual UAV.

The operations of blocks 602-606, 412-420 of the method 600 may be performed in a continuous loop by the autonomous vehicle override control system as the remote pilot provides further control inputs.

FIG. 7 illustrates an exemplary rotorcraft-type UAV 130, such as a quadcopter-type UAV, that is suitable for use with various embodiments described with reference to FIGS. 1-6. With reference to FIGS. 1-7, the rotorcraft-type UAV 130 may include a body 700 (i.e., fuselage, frame, etc.) that may be made out of any combination of plastic, metal, or other materials suitable for flight. The body 700 may include a processor 730 that is configured to monitor and control the various functionalities, subsystems, and/or other components of the rotorcraft-type UAV 130. For example, the processor 730 may be configured to monitor and control various functionalities of the rotorcraft-type UAV 130, such as any combination of modules, software, instructions, circuitry, hardware, etc. related to propulsion, navigation, power management, sensor management, and/or stability management.

The processor 730 may include one or more processing unit(s) 701, such as one or more processors configured to execute processor-executable instructions (e.g., applications, routines, scripts, instruction sets, etc.), a memory and/or storage unit 702 configured to store data (e.g., control plans, obtained sensor data, received messages, applications, etc.), and one or more wireless transceiver(s) 704 and antenna(s) 706 for transmitting and receiving wireless signals (e.g., a Wi-Fi® radio and antenna, Bluetooth®, RF, etc.). The rotorcraft-type UAV 130 may also include components for communicating via various wide area networks, such as cellular network transceivers or chips and associated antenna (not shown). The processor 730 of the rotorcraft-type UAV 130 may further include various input units 708 for receiving data from human operators and/or for collecting data indicating various conditions relevant to the rotorcraft-type UAV 130. Using the example of an aerial UAV, the input units 708 may include camera(s), microphone(s), location information functionalities (e.g., a global positioning system (GPS) receiver/antenna for receiving GPS signals), flight instruments (e.g., attitude indicator(s), gyroscope(s), accelerometer(s), altimeter(s), compass(es), etc.), keypad(s), etc. The various components of the processor 730 may be connected via a bus 710 or other similar circuitry.

The body 700 may include landing gear 720 of various designs and purposes, such as legs, skis, wheels, pontoons, etc. The body 700 may include a power source 712 that may be coupled to and configured to power the various other components of the rotorcraft-type UAV 130. For example, the power source 712 may be a rechargeable battery for providing power to operate the motors 722 and/or the units of the processor 730.

The rotorcraft-type UAV 130 may be of a rotorcraft design that utilizes one or more rotors 724 driven by corresponding motors 722 to provide lift-off (or takeoff) as well as other aerial movements (e.g., forward progression, ascension, descending, lateral movements, tilting, rotating, etc.). The rotorcraft-type UAV 130 may utilize various motors 722 and corresponding rotors 724 for lifting off and providing aerial propulsion. For example, the rotorcraft-type UAV 130 may be a "quadcopter" that is equipped with four motors 722 and corresponding rotors 724. The motors 722 may be coupled to the processor 730 and thus may be configured to receive operating instructions or signals from the processor 730. For example, the motors 722 may be configured to increase rotation speed of their corresponding rotors 724, etc. based on instructions received from the processor 730. The motors 722 may be independently controlled by the processor 730 such that some rotors 724 may be engaged at different speeds, using different amounts of power, and/or providing different levels of output for moving the rotorcraft-type UAV 130. For example, motors 722 on one side of the body 700 may be configured to cause their corresponding rotors 724 to spin at a higher rate of rotations (e.g., RPM) than rotors 724 on the opposite side of the body 700 in order to balance the rotorcraft-type UAV 130.

The various processors described herein may be any programmable microprocessor, microcomputer or multiple processor chip or chips that can be configured by software instructions (applications) to perform a variety of functions, including the functions of various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The operations of a method or algorithm disclosed herein may be embodied in a processor-executable software module or processor-executable software instructions, which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray Disc® where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present invention is not intended to be limited to the embodiments shown herein but is to be accorded the widest scope consistent with the following claims and the principles and novel features disclosed herein.

What is claimed is:

1. A method for an autonomous vehicle override control system to provide override commands to a target unmanned autonomous vehicle (UAV), comprising:
   identifying, via a processor of the autonomous vehicle override control system, a certification for a remote pilot for a first UAV type based on login credentials from the remote pilot;
   obtaining, via the processor, a first control model for the first UAV type based on the certification;
   obtaining, via the processor, a second control model for the target UAV of a second UAV type;
   receiving, via the processor, an input command from a control input device corresponding to the first UAV type;
   calculating, via the processor, a first physical movement of a virtual UAV of the first UAV type using the first control model and the input command;
   estimating, via the processor, a second physical movement of the target UAV that is similar to the first physical movement; and
   generating, via the processor, an override command for the target UAV using the second control model and the second physical movement.

2. The method of claim 1, further comprising transmitting, via the processor, the override command to the target UAV.

3. The method of claim 2, further comprising:
   obtaining, via the processor, connection information for communicating with the target UAV, wherein the connection information is one or more of an access code, a transmission frequency, a transmission medium, an identifier of an intermediary receiver device, and a message format, and
   wherein transmitting the override command to the target UAV comprises:
      transmitting the override command to the target UAV using the connection information for the target UAV.

4. The method of claim 1, wherein identifying, via the processor of the autonomous vehicle override control system, the certification for the remote pilot for the first UAV type based on the login credentials from the remote pilot comprises:
   obtaining, via the processor, a pilot profile for the remote pilot, wherein the pilot profile is a data record that includes data indicating one or more certifications for piloting different UAV types; and
   identifying, via the processor, the certification for the first UAV type based on the pilot profile.

5. The method of claim 4, further comprising:
   retrieving, via the processor, an experience profile based on the login credentials from the remote pilot, wherein the experience profile is stored within the pilot profile and includes data indicating experience with UAVs of the second UAV type; and
   configuring, via the processor, the first control model and the second control model based at least in part on the experience profile.

6. The method of claim 5, wherein the experience with UAVs of the second UAV type comprises a time spent controlling UAVs of the second UAV type, a diversity of maneuvers executed with regard to the UAVs of the second UAV type, or both.

7. The method of claim 5, further comprising updating, via the processor, the experience profile based on the input command.

8. The method of claim 1, wherein obtaining, via the processor, the first control model for the first UAV type based on the certification and obtaining, via the processor, the second control model for the target UAV of the second UAV type comprises retrieving, via the processor, the first control model and the second control model from a database of control models.

9. The method of claim 8, wherein retrieving, via the processor, the first control model and the second control model from the database of control models comprises downloading, via the processor, the database of control models from a remote server.

10. The method of claim 1, wherein calculating, via the processor, the first physical movement of the virtual UAV of the first UAV type using the first control model and the input command comprises:
    performing, via the processor, a simulation using the first control model to determine how the virtual UAV of the first UAV type would move in response to receiving the input command.

11. The method of claim 10, wherein performing, via the processor, the simulation using the first control model to determine how the virtual UAV would move in response to receiving the input command comprises:
    identifying, via the processor, a setting associated with the virtual UAV for an engine, a flap, an actuator, a rotor, a ballast, or any combination thereof.

12. The method of claim 10, wherein performing, via the processor, the simulation using the first control model to determine how the virtual UAV would move in response to receiving the input command comprises:
    identifying, via the processor, a change in an altitude of the virtual UAV, a speed of the virtual UAV, a roll state of the virtual UAV, a pitch state of the virtual UAV, a yaw state of the virtual UAV, or any combination thereof.

13. The method of claim 1, wherein estimating, via the processor, the second physical movement that is similar to the first physical movement comprises:
    identifying, via the processor, a first component of the target UAV that has a similar function as a second component of the virtual UAV.

14. The method of claim 1, wherein generating, via the processor, the override command for the target UAV using the second control model and the second physical movement comprises:
    performing, via the processor, a reverse simulation using the second control model to identify the override command that would cause the target UAV to move according to the second physical movement.

15. The method of claim 1, further comprising:
    obtaining, via the processor, information regarding current conditions at the target UAV; and
    configuring, via the processor, the first control model and the second control model based at least in part on the information regarding the current conditions at the target UAV.

16. The method of claim 15, wherein the information regarding the current conditions at the target UAV includes sensor data from the target UAV, settings of instruments of the target UAV, weather conditions near the target UAV, or any combination thereof.

17. The method of claim 15, further comprising synchronizing, via the processor, a display, the control input device, or both to the information regarding the current conditions at the target UAV.

18. A computing device, comprising a processor configured with processor-executable instructions to:
   identify a certification for a remote pilot for a first unmanned autonomous vehicle (UAV) type based on login credentials from the remote pilot;
   obtain a first control model for the first UAV type based on the certification;
   obtain a second control model for a target UAV of a second UAV type;
   receive an input command from a control input device corresponding to the first UAV type;
   calculate a first physical movement of a virtual UAV of the first UAV type using the first control model and the input command;
   estimate a second physical movement of the target UAV that is similar to the first physical movement of the virtual UAV; and
   generate an override command for the target UAV using the second control model and the second physical movement.

19. The computing device of claim 18, wherein the processor is further configured with processor-executable instructions to transmit the override command to the target UAV.

20. The computing device of claim 18, wherein the processor is further configured with processor-executable instructions to identify the certification for the remote pilot for the first UAV type based on the login credentials from the remote pilot by:
   obtain a pilot profile for the remote pilot, wherein the pilot profile is a data record that includes data indicating one or more certifications for piloting different UAV types; and
   identify the certification for the first UAV type based on data within the pilot profile.

21. The computing device of claim 20, wherein the processor is further configured with processor-executable instructions to:
   retrieve an experience profile based on the login credentials from the remote pilot, wherein the experience profile is stored within the pilot profile and includes data indicating experience with UAVs of the second UAV type; and
   configure the first control model and the second control model based at least in part on the experience profile.

22. The computing device of claim 21, wherein the processor is further configured with processor-executable instructions to update the experience profile based on the input command.

23. The computing device of claim 18, wherein the processor is further configured with processor-executable instructions to obtain the first control model for the first UAV type based on the certification and the second control model for the second UAV type by retrieving the first control model and the second control model from a database of control models.

24. The computing device of claim 23, wherein the processor is further configured with processor-executable instructions to retrieve the first control model and the second control model from the database of control models by downloading the database of control models from a remote server.

25. The computing device of claim 18, wherein the processor is further configured with processor-executable instructions to calculate the first physical movement of the virtual UAV using the first control model and the input command by performing a simulation using the first control model to determine how the virtual UAV would move in response to receiving the input command.

26. The computing device of claim 18, wherein the processor is further configured with processor-executable instructions to estimate the second physical movement of the target UAV that is similar to the first physical movement of the virtual UAV by identifying a first component of the target UAV that has a similar function as a second component of the virtual UAV.

27. The computing device of claim 18, wherein the processor is further configured with processor-executable instructions to generate the override command for the target UAV using the second control model and the second physical movement by performing a reverse simulation using the second control model to identify the override command that would cause the target UAV to move according to the second physical movement.

28. The computing device of claim 18, wherein the processor is further configured with processor-executable instructions to:
   obtain information regarding current conditions at the target UAV; and
   configure the first control model and the second control model based at least in part on the information regarding the current conditions at the target UAV.

29. A computing device, comprising:
   means for identifying a certification for a remote pilot for a first unmanned autonomous vehicle (UAV) type based on login credentials from the remote pilot;
   means for obtaining a first control model for the first UAV type based on the certification;
   means for obtaining a second control model for a target UAV of a second UAV type;
   means for receiving an input command from a control input device corresponding to the first UAV type;
   means for calculating a first physical movement of a virtual UAV of the first UAV type using the first control model and the input command;
   means for estimating a second physical movement of the target UAV that is similar to the first physical movement of the virtual UAV; and
   means for generating an override command for the target UAV using the second control model and the second physical movement.

30. A non-transitory processor-readable storage medium having stored thereon processor-executable instructions configured to cause a processor of a computing device to perform operations comprising:
   identifying a certification for a remote pilot for a first unmanned autonomous vehicle (UAV) type based on login credentials from the remote pilot;
   obtaining a first control model for the first UAV type based on the certification;
   obtaining a second control model for a target UAV of a second UAV type;
   receiving an input command from a control input device corresponding to the first UAV type;

calculating a first physical movement of a virtual UAV of the first UAV type using the first control model and the input command;
estimating a second physical movement of the target UAV that is similar to the first physical movement of the virtual UAV; and
generating an override command for the target UAV using the second control model and the second physical movement.

\* \* \* \* \*